United States Patent
Lopez Perez (10) Patent No.: US 10,400,825 B2
(45) Date of Patent: Sep. 3, 2019

(54) VIBRATION DAMPER FOR A TORQUE TRANSMISSION DEVICE OF A MOTOR VEHICLE

(71) Applicant: VALEO EMBRAYAGES, Amiens (FR)

(72) Inventor: Carlos Lopez Perez, Madrid (ES)

(73) Assignee: Valeo Embrayages, Amiens (FR)

( * ) Notice: Subject to any disclaimer, the term of this patent is extended or adjusted under 35 U.S.C. 154(b) by 191 days.

(21) Appl. No.: 14/652,601

(22) PCT Filed: Dec. 20, 2013

(86) PCT No.: PCT/FR2013/053218
§ 371 (c)(1),
(2) Date: Jun. 16, 2015

(87) PCT Pub. No.: WO2014/096735
PCT Pub. Date: Jun. 26, 2014

(65) Prior Publication Data
US 2015/0369296 A1 Dec. 24, 2015

(30) Foreign Application Priority Data
Dec. 21, 2012 (FR) ...................... 12 62613

(51) Int. Cl.
*F16F 15/121* (2006.01)
*F16D 3/12* (2006.01)

(52) U.S. Cl.
CPC .............. *F16D 3/12* (2013.01); *F16F 15/121* (2013.01); *F16F 15/1213* (2013.01); *F16F 15/1215* (2013.01); *F16F 2230/0064* (2013.01)

(58) Field of Classification Search
CPC ... F16D 3/12; F16F 15/121; F16F 2230/0064; F16F 15/1213; F16F 15/1215
See application file for complete search history.

(56) References Cited

U.S. PATENT DOCUMENTS 2,551,718 A 5/1951 Auten
2,837,902 A * 6/1958 Stevens ................... F16F 15/12
464/101

(Continued)

FOREIGN PATENT DOCUMENTS

DE 19538722 4/1997
DE 19721236 12/1997

(Continued)

OTHER PUBLICATIONS

Translation of FR 2828543.*

*Primary Examiner* — Vicky A Johnson
(74) *Attorney, Agent, or Firm* — Berenato & White, LLC (57) ABSTRACT

A vibration damper for a torque transmission device comprising a first element and a second element which are rotatable relative to each other around an axis of rotation X; and damping means for transmitting a torque and damping the rotational acyclisms between the first element and the second element. The damping means comprise an elastic blade mounted securely on the first element and provided with a cam surface; and the damper comprises a cam follower carried by the second element and arranged to cooperate with the cam surface. The cam surface is arranged such that, for an angular travel between the first element and the second element relative to an angular rest position, the cam follower exerts a flexion force on the elastic blade producing a reaction force able to return the first and second elements to the angular rest position.

9 Claims, 5 Drawing Sheets (56) References Cited

U.S. PATENT DOCUMENTS

| | | | |
|---|---|---|---|
| 4,145,936 A | | 3/1979 | Vincent et al. |
| 4,300,363 A | * | 11/1981 | Mathues ............... F16D 3/52 192/209 |
| 4,378,220 A | * | 3/1983 | Seppala ................. F16D 3/00 464/55 |
| 4,488,629 A | * | 12/1984 | Loizeau ............. F16F 15/1212 192/201 |
| 4,646,899 A | * | 3/1987 | Murakami ............... F16D 3/52 192/209 |
| 4,703,840 A | | 11/1987 | Bopp |
| 4,718,530 A | | 1/1988 | Loizeau et al. |
| 4,795,012 A | | 1/1989 | Durum |
| 4,800,996 A | | 1/1989 | Loizeau |
| 5,066,147 A | | 11/1991 | Brandenstein et al. |
| 5,205,788 A | | 4/1993 | Sacher et al. |
| 5,477,950 A | | 12/1995 | Maloof |
| 5,697,261 A | | 12/1997 | Mokdad et al. |
| 5,823,311 A | | 10/1998 | Mokdad |
| 5,893,355 A | | 4/1999 | Glover et al. |
| 5,908,095 A | | 6/1999 | Jaeckel et al. |
| 6,073,503 A | * | 6/2000 | Matsuno ................ B65B 65/02 74/53 |
| 6,176,785 B1 | | 1/2001 | Geislinger |
| 6,224,487 B1 | | 5/2001 | Yuergens |
| 6,398,655 B1 | | 6/2002 | Orlamunder et al. |
| 6,471,024 B2 | * | 10/2002 | Ota .......................... F16D 7/10 192/53.6 |
| 6,585,091 B2 | | 7/2003 | Reinhart et al. |
| 8,202,183 B2 | | 6/2012 | Riu |
| 8,257,211 B2 | | 9/2012 | Riu |
| 8,689,952 B2 | | 4/2014 | Toshihisa |
| 2001/0032767 A1 | | 10/2001 | Reinhart et al. |
| 2002/0052242 A1 | | 5/2002 | Tabuchi et al. |
| 2003/0106763 A1 | | 6/2003 | Kimura et al. |
| 2003/0226734 A1 | | 12/2003 | Uehara |
| 2008/0171604 A1 | | 7/2008 | Chaudhari et al. |
| 2010/0122605 A1 | | 5/2010 | Maienschein |
| 2017/0234400 A1 | * | 8/2017 | Fenioux ............. F16F 15/1215 464/101 |
| 2017/0363195 A1 | * | 12/2017 | Durham ............. F16F 15/1333 |

FOREIGN PATENT DOCUMENTS

| | | | |
|---|---|---|---|
| DE | 19729421 | | 1/1998 |
| DE | 19808730 | | 9/1999 |
| DE | 19919449 | A1 | 11/1999 |
| DE | 10017801 | | 10/2001 |
| DE | 102004024747 | | 12/2005 |
| DE | 102008018218 | | 11/2008 |
| DE | 102009050670 | | 5/2010 |
| DE | 102010047803 | | 4/2011 |
| DE | 102010049929 | | 5/2011 |
| EP | 1048420 | | 11/2000 |
| EP | 1195536 | | 4/2002 |
| EP | 1691107 | | 8/2006 |
| EP | 2157336 | | 2/2010 |
| EP | 2530354 | | 12/2012 |
| FR | 2339107 | A1 | 8/1977 |
| FR | 2493446 | | 5/1982 |
| FR | 2499182 | A1 | 8/1982 |
| FR | 2546251 | | 11/1984 |
| FR | 2602560 | | 2/1988 |
| FR | 2611013 | | 8/1988 |
| FR | 2628804 | | 9/1989 |
| FR | 2714435 | | 6/1995 |
| FR | 2738606 | | 3/1997 |
| FR | 2752278 | | 2/1998 |
| FR | 2764958 | | 12/1998 |
| FR | 2768208 | | 3/1999 |
| FR | 2823275 | | 10/2002 |
| FR | 2828543 | | 2/2003 |
| FR | 2838490 | | 10/2003 |
| FR | 2828543 B1 * | 2/2004 ........ F16F 15/13157 |
| FR | 2843432 | | 2/2004 |
| FR | 2862730 | | 5/2005 |
| FR | 2894006 | | 6/2007 |
| FR | 2913256 | | 9/2008 |
| FR | 2922620 | | 4/2009 |
| FR | 2938030 | | 5/2010 |
| GB | 1212042 | A | 11/1970 |
| GB | 2000257 | | 1/1979 |
| GB | 2169380 | | 7/1986 |
| GB | 2235749 | A | 3/1991 |
| GB | 2262795 | A | 6/1993 |
| GB | 2289558 | A | 5/1995 |
| GB | 2284875 | | 6/1995 |
| GB | 2306620 | | 5/1997 |
| GB | 2331132 | | 5/1999 |
| GB | 2338773 | | 7/2002 |
| GB | 2468030 | | 8/2010 |
| JP | 9280317 | | 10/1997 |
| JP | 2000192992 | | 7/2000 |
| JP | 2011047462 | | 3/2011 |
| WO | WO199528580 | | 10/1995 |
| WO | WO9914114 | A1 | 3/1999 |
| WO | WO9941525 | | 8/1999 |
| WO | WO2004016968 | | 2/2004 |
| WO | WO2006070422 | | 7/2006 |
| WO | WO2007000140 | | 1/2007 |
| WO | WO2008004257 | | 1/2008 |
| WO | WO2008004258 | | 1/2008 |
| WO | WO2009047816 | | 4/2009 |
| WO | WO2011006264 | | 1/2011 |

* cited by examiner

VIBRATION DAMPER FOR A TORQUE TRANSMISSION DEVICE OF A MOTOR VEHICLE

CROSS-REFERENCE TO RELATED APPLICATIONS AND CLAIM TO PRIORITY

This application is a national stage application of International Application No. PCT/FR2013/053218 filed Dec. 20, 2013, which claims priority to French Patent Application No. 1262613 filed Dec. 21, 2012, the disclosures of which are incorporated herein by reference and to which priority is claimed.

FIELD OF THE INVENTION

The invention relates to a torsional vibration damper intended to be fitted to a torque transmission device. The invention relates more particularly to the field of motor vehicle transmissions.

BACKGROUND OF THE INVENTION

In the field of motor vehicle transmissions, it is known to provide torque transmission devices with torsional vibration dampers allowing absorption and damping of the vibrations and acyclisms generated by an internal combustion engine.

The vibration dampers comprise an input element and an output element which are rotatable around a common axis of rotation, and elastic damping means for transmitting the torque and damping the rotational acyclisms between the input element and the output element.

Such vibration dampers are used in particular on dual mass flywheels (DVA), clutch friction plates in the case of manual or semiautomatic transmission, or lock-up clutches fitted to hydraulic coupling devices in the case of automatic transmission.

Documents FR 2894006, FR 2913256 and FR 2922620 illustrate vibration dampers fitted respectively to a dual mass flywheel, a clutch friction plate and a lock-up clutch. The elastic damping means used on these vibration dampers are helicoidal springs with circumferential effect, the ends of which come to rest firstly against stops integral with the input elements and secondly against stops integral with the output elements. Thus any rotation of said elements relative to each other causes a compression of the damper springs in one direction or the other, and said compression exerts a return force able to return said elements to a relative angular rest position. The helicoidal springs may be straight or curved.

The stiffness of such a damper is determined as a function of the number of helicoidal springs used therein, the intrinsic stiffness of the springs and the installation diameter of the springs. The choice of stiffness of such vibration dampers results from a compromise between the acyclism filtration efficacy, which increases as the stiffness diminishes, and the capacity to transmit the maximum engine torque without the coils of the springs coming to rest against each other, which requires a sufficient stiffness.

In order to improve the filtration performance for low-torque vibrations, it is known to provide vibration dampers for which the characteristic curve of the torque transmitted as a function of the angular travel has several gradients. Thus at low torque, the stiffness of the damper is less, whereas when approaching the maximum engine torque to be transmitted, the stiffness of the vibration damper is greater. Such a vibration damper is described in particular in document EP 2157336. However, the stiffness change zones cause discontinuities and shocks which are harmful to the quality of the acyclism damping.

Also, as the helicoidal springs are arranged circumferentially, they are extremely susceptible to centrifugal force. Also, the input and/or output elements must be equipped with means allowing the springs to be retained radially and hence prevent their ejection. However these radial retention means introduce parasitic friction, which affects the damping function by blocking the springs when the rotation speed is too high. Attempts have been made to reduce the effect of the parasitic friction by providing complex geometries, surface treatment, or by the introduction of grease. However these measures render production of the vibration dampers more complex and are not therefore totally satisfactory.

Finally, since the space available for the helicoidal springs is limited, the angular travel between the input and output of the vibration damper is also limited, and the helicoidal springs must have a sufficient stiffness to allow transmission of the maximum engine torque.

Thus vibration dampers with helicoidal springs are not totally satisfactory.

SUMMARY OF THE INVENTION

The invention proposes to remedy these problems by proposing a vibration damper with improved performance.

To this end, according to a first aspect, the invention concerns a vibration damper for a torque transmission device comprising:
  a first element and a second element which are rotatable relative to each other around an axis of rotation X; and
  damping means for transmitting a torque and damping the rotational acyclisms between the first element and the second element.

The vibration damper is remarkable in that the elastic damping means comprise an elastic blade mounted securely on the first element and provided with a cam surface; and in that it comprises a cam follower carried by a second element and arranged to cooperate with said cam surface. Also, the cam surface is arranged such that, for an angular travel between the first element and the second element relative to an angular rest position, the cam follower exerts a flexion force on the elastic blade producing a reaction force able to return said first and second elements to said angular rest position.

Therefore the damping means are less susceptible to centrifugal force than the helicoidal springs of the prior art, and their damping capacity is not adversely affected by a high rotation speed of the internal combustion engine.

Also, the structure of such a damper allows relatively large travel paths.

Also, such a damper may have a characteristic curve showing variations in the transmitted torque as a function of the angular travel, in which the gradient variations have no inflection points or discontinuities.

Finally, as the cam surface is carried by the elastic blade, production of a damper according to the invention may be partly standardized. In fact, the geometry and characteristics of the blade only require adaptation when the characteristics of a damper must be adapted to the characteristics of the proposed application, in particular to the maximum engine torque to be transmitted.

According to other advantageous embodiments, such a vibration damper may have one or more of the following characteristics:

the cam follower is arranged radially outside the elastic blade. Such an arrangement allows radial retention of the elastic blade when it is subjected to centrifugal force. Also, this arrangement allows an increase in stiffness of the elastic blade under the effect of centrifugal force.

the cam surface is formed at a free end of the elastic blade.

the blade comprises a portion of radial orientation extended by a curved portion, at the free end of which the cam surface is formed. Such a structure gives both a low rigidity and a satisfactory mechanical strength.

the damper comprises a second elastic blade provided with a cam surface and mounted securely on the first element, and a second cam follower arranged to cooperate with the cam surface of said second elastic blade. Such an arrangement allows an increase in the torque capacity of the damper.

the first and second elastic blades are symmetrical relative to the axis of rotation X. The damper is therefore balanced.

the first and second elastic blades are formed from a single piece.

the cam follower is a roller mounted rotatably on the second element.

the roller is mounted rotatably on the second element via a roller bearing.

According to a second aspect, the invention concerns a torque transmission element, in particular for a motor vehicle, comprising a vibration damper according to the first aspect of the invention.

In one embodiment, the torque transmission element comprises two vibration dampers arranged in series. Such an arrangement allows a further increase in angular travel.

In another embodiment, the torque transmission element comprises two vibration dampers arranged in parallel. Thus the torque transmission element may have a greater torque capacity.

BRIEF DESCRIPTION OF THE DRAWINGS

The invention will be better understood, and other objectives, details, characteristics and advantages thereof will arise more clearly from the description below of several particular embodiments of the invention which are given solely for illustration and without limitation, with reference to the attached drawings.

On the drawings.

DETAILED DESCRIPTION OF THE PREFERRED EMBODIMENT(S)

Figure 1:
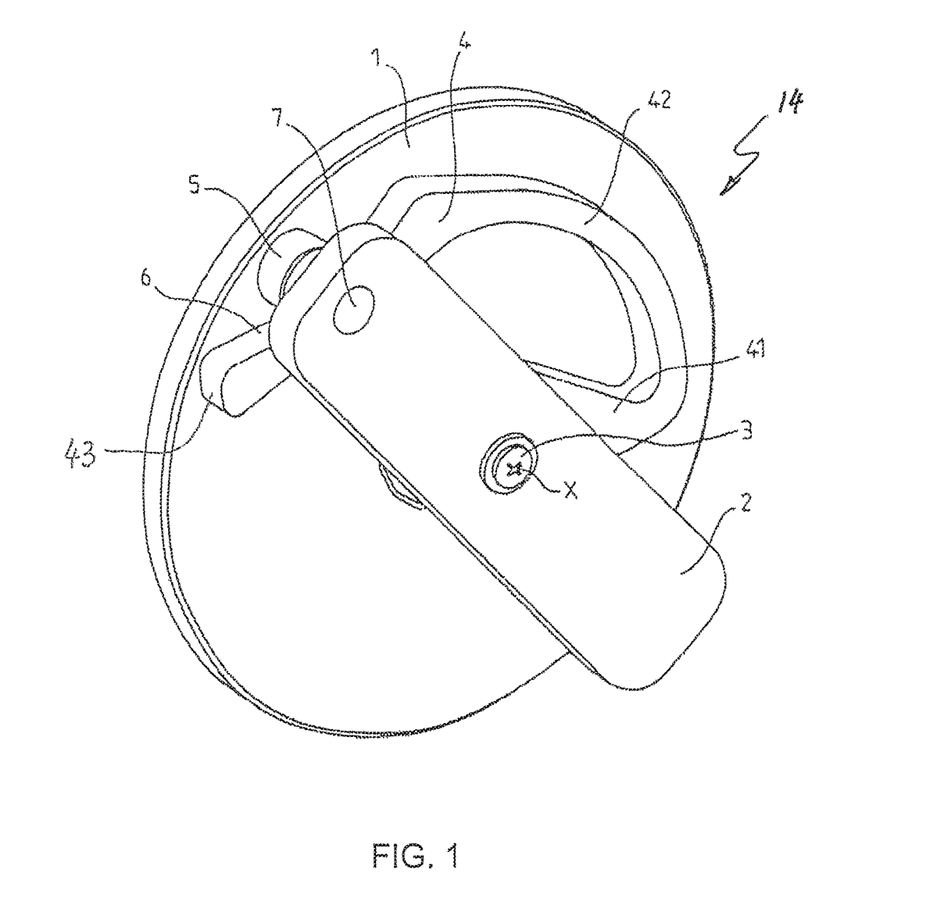
FIG. 1 is a perspective view of a vibration damper according to a first embodiment.

A torsional vibration damper 14 shown on FIG. 1 is intended to be integrated in a transmission element of the transmission train of a motor vehicle. This transmission element may for example be an engine flywheel equipped with the torsional vibration damper 14, such as a dual mass flywheel, a lock-up clutch of a hydraulic coupling device, or a clutch friction plate. It is also noted that in the case of a clutch friction plate, the torsional vibration damper 14 according to the invention may be formed as a main damper and/or as a pre-damper.

Figure 7:
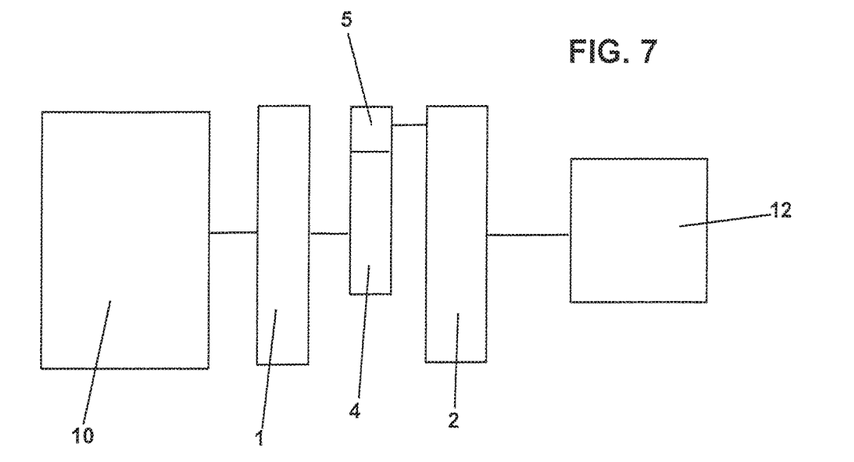
FIG. 7 is a schematic view of a transmission train of a motor vehicle showing the vibration damper between an internal combustion engine and a gearbox.
Figure 8:
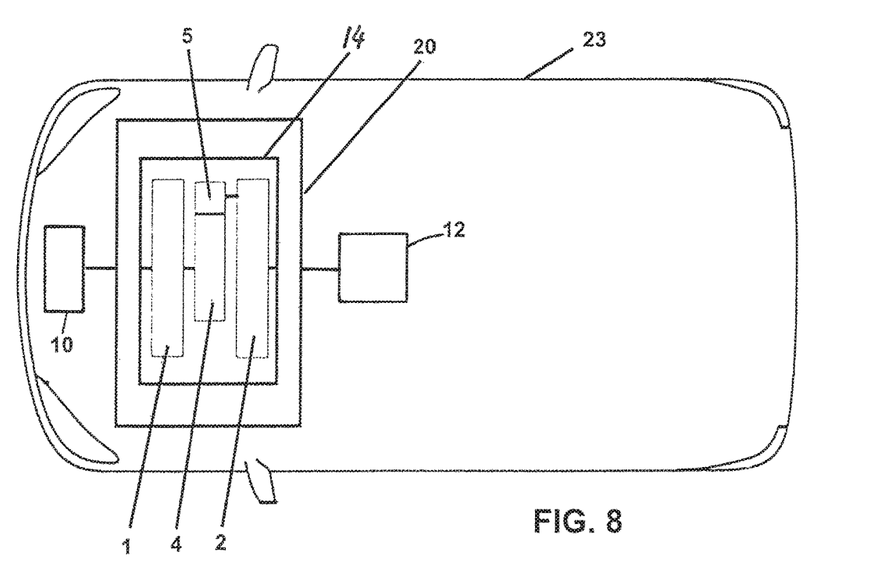
FIG. 8 is a schematic view of a hydraulic coupling device including the vibration damper according to the present invention in a motor vehicle.

The torsional vibration damper 14 comprises an input element 1 and an output element 2 which are arranged, in the transmission train, on the side of an internal combustion engine 10 and on the side of a gearbox 12, respectively, as illustrated in FIG. 7. For example, when the vibration damper according to the invention is integrated in a dual mass flywheel, the input element 1 may comprise or be carried by a first inertia flywheel intended to be fixed to the end of a drive shaft, such as a crankshaft of an internal combustion engine 10, while the output element 2 comprises or is carried by a second inertia flywheel, generally forming a reaction plate of a clutch for connection to a driven shaft, such as an input shaft of the gearbox 12. FIG. 8 shows the vibration damper 14 of the present invention employed in a hydraulic coupling device 20 for a transmission train of a motor vehicle 23 between the internal combustion engine 10 and the gearbox 12.

The input element 1 and output element 2 are rotatable about a common axis of rotation X. The input element and output element 2 are guided in rotation relative to each other by means of a bearing such as a roller bearing 3.

The input element 1 and output element 2 are connected in rotation by damping means. The damping means are able to transmit a torque exceeding 200 N·m, preferably exceeding 300 N·m, (see FIG. 6a-6c) driving the input element 1 towards the output element 2 (direct direction) and a resistant torque of the output element 2 towards the input element 1 (reverse direction). Secondly, the damping means develop an elastic return torque tending to return the input element 1 and the output element 2 to a relative angular rest position.

The damping means comprise an elastic blade 4. The elastic blade 4 has a free distal end 43 and a connecting portion 44 spaced from the free distal end 43. The connecting portion 44 of the elastic blade 4 is securely (i.e., non-moveably or fixedly) mounted in rotation on the input element 1. At one free end 43, the elastic blade 4 has a cam surface 6 preceding (or anterior to) the free distal end 43 of the elastic blade 4 and arranged to cooperate with a cam follower: a roller 5 mounted on the output element 2. The elastic blade 4 is designed so that it can tolerate high stresses which may amount to 1500 MPa. The elastic blade 4 is for example made of 51CV4 steel which has undergone dedicated heat treatment such as quenching followed by annealing.

The connecting portion 44 of the elastic blade 4 is fixed (i.e., non-moveably coupled) to the input element 1 close to the axis of rotation X. The elastic blade 4 further comprises an arm portion 41 extending substantially radially outwardly from the connecting portion 44 on the input element 1. The arm portion 41 is extended via an elbow by a curved portion 42 adjacent to the connecting portion 44. The curved portion 42 extends substantially circumferentially. As illustrated in FIGS. 1-5, a radially outer surface of the curved portion 42 of the elastic blade 4 forms the cam surface 6, which is anterior to the free distal end 43 of the elastic blade 4, i.e., is disposed between the free end 43 and the arm portion 41 of the elastic blade 4. The radius of curvature of the curved portion 42, and the distance between the elbow extending between the portion 41 and the curved portion 42, are determined as a function of the desired stiffness of the elastic blade 4. The elastic blade 4 may, as required, be produced from one piece or be composed from a plurality of blades axially fixed to each other.

The roller 5 is mounted rotatably on the output element 2 around the axis of rotation 7. The roller 5 is held resting against the cam surface 6 and is arranged to roll against said cam surface 6 on a relative movement between the input element 1 and the output element 2. The roller 5 is arranged radially outside the cam surface 6 so as to hold the elastic blade 4 radially when it is subjected to centrifugal force. In order to reduce the parasitic friction liable to affect the damping function, the roller 5 is mounted in rotation on the output element 2 by means of a roller bearing. For example, the roller bearing may be a ball bearing or a roller bearing. In one embodiment, the roller 5 has an antifriction coating.

FIG. 1 illustrates the input element 1 and the output element 2 in a relative angular rest position.

The cam surface 6 is arranged such that, for an angular travel between the input element and the output element to either side of this relative angular rest position, the roller 5 moves on the cam surface 6 and by doing so, exerts a flexion force on the elastic blade 4. In reaction, the cam surface 6 exerts a return force on the roller 5 which tries to bring the input element 1 and output element 2 back to their relative angular rest position.

The function of the vibration damper will now be explained in relation to FIGS. 2 and 3.

Figure 2:
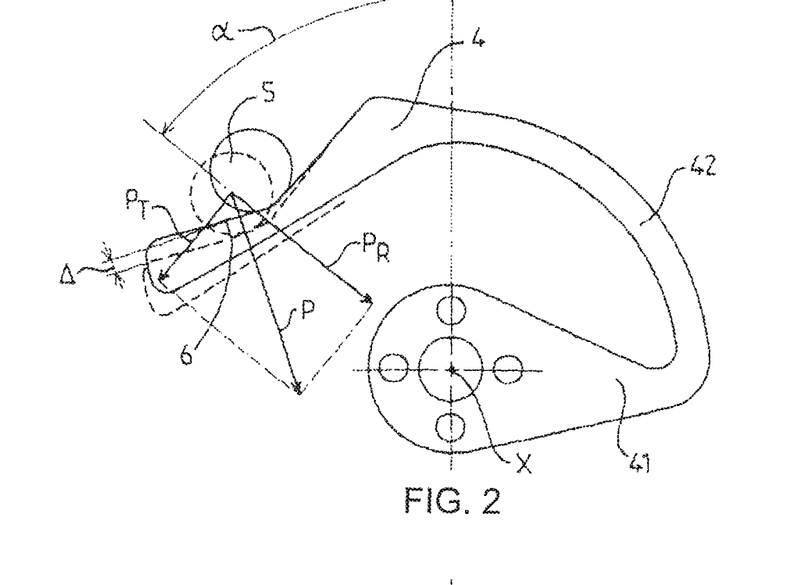
FIG. 2 illustrates the flexion of the blade of the vibration damper according to FIG. 1 on an angular travel between the input and output elements in an direct direction.

When a driving motor torque is transmitted from the input element 1 to the output element 2 (direct direction), the torque to be transmitted causes a relative travel between the input element 1 and the output element 2 in a first direction (see FIG. 2). The roller 5 is then moved through an angle α relative to the elastic blade 4. The movement of the roller 5 on the cam surface 6 causes a flexion of the elastic blade 4 according to arrow A. To illustrate the flexion of the blade 4, the blade 4 is shown in solid lines in its angular rest position and in dotted lines in its angular travel.

The flexion force P depends in particular on the geometry of the blade and its material, in particular its modulus of transverse elasticity. The flexion force P breaks down into a radial component Pr and a tangential component Pt. The tangential component Pt allows transmission of the engine torque. In reaction, the elastic blade 4 exerts a reaction force on the roller 5, the tangential component of which constitutes a return force which tries to bring the input element 1 and output element 2 back to their relative angular rest position.

Figure 3:
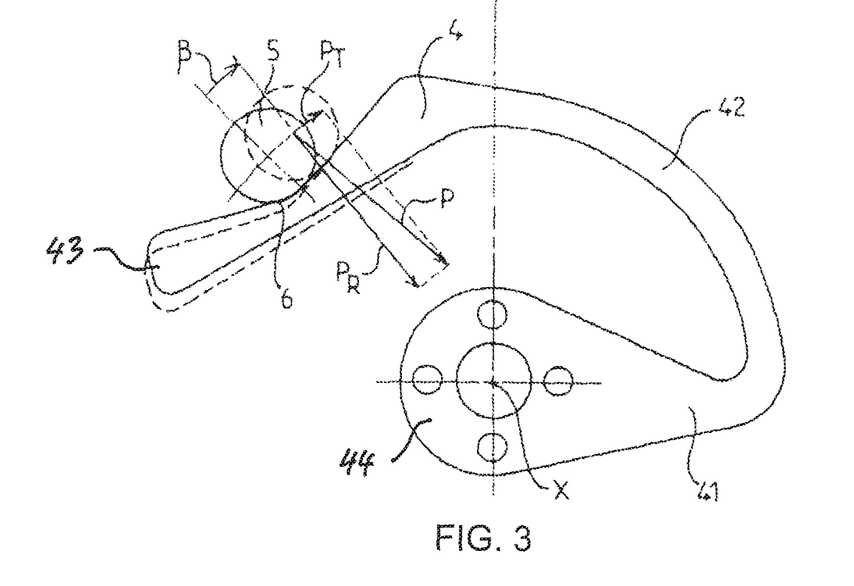
FIG. 3 illustrates the flexion of the blade on an angular travel in a reverse direction.

When a resistant torque is transmitted from the output element 2 to the input element 2 (reverse direction), the torque to be transmitted causes a relative travel between the input element 1 and the output element 2 in a second opposite direction (see FIG. 3). The roller 5 is then moved through an angle β relative to the elastic blade 4. In this case, the tangential component Pt of the flexion force has an opposite direction to the tangential component of the flexion force illustrated on FIG. 2. Similarly, the elastic blade exerts a reaction force in the opposite direction to that illustrated on FIG. 2, so as to bring the input element 1 and output element 2 back to their relative angular rest position.

The torsional vibrations and the torque irregularities produced by the internal combustion engine are transmitted by the drive shaft to the input element 1, and also generate relative rotations between the input element 1 and output element 2. These vibrations and irregularities are damped by the flexion of the elastic blade 4.

Figure 6A:
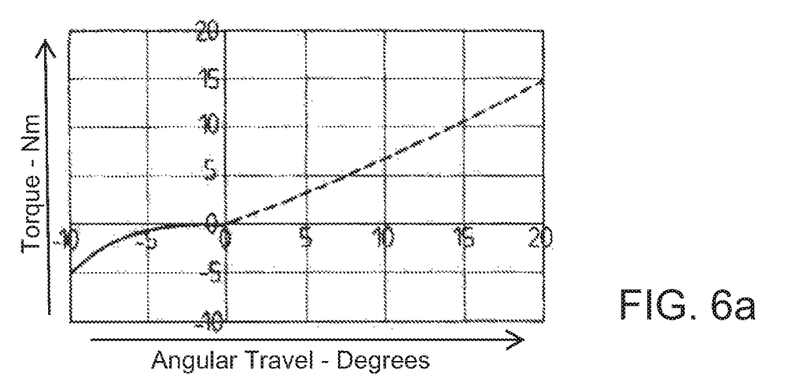
FIGS. 6a, 6b, 6c illustrate examples of characteristic curves depicting the torque transmitted as a function of the angular travel, obtained by damping means according to the teaching of the invention.
Figure 6B:
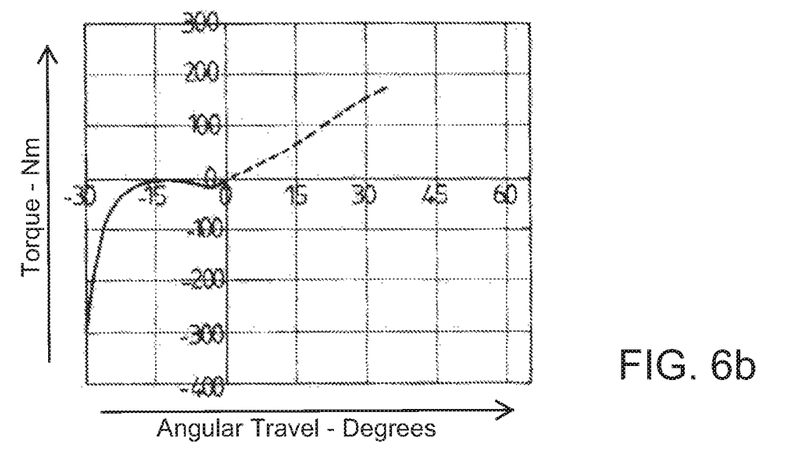
Figure 6C:
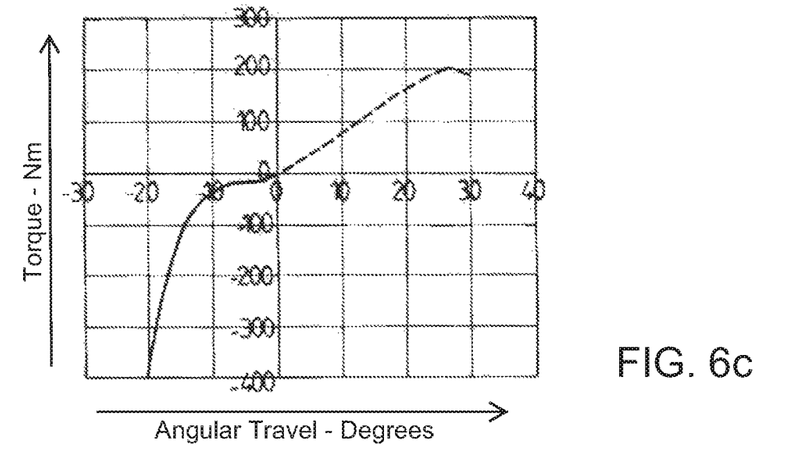

FIGS. 6a, 6b and 6c illustrate characteristic curves of the vibration dampers produced in accordance with the teaching of the invention. FIG. 6a shows the characteristic curve of a pre-damper intended to be fitted to a clutch friction plate, while FIGS. 6b and 6c represent characteristic curves of main dampers intended to be fitted to clutch friction plates. These characteristic curves represent the torque transmitted, expressed in Nm, as a function of the angular travel, expressed in degrees. The relative travel between the input element 1 and output element 2 in the direct direction is shown in dotted lines, whereas the travel in the reverse direction is shown in solid lines. It is noted that a vibration damper according to the invention in particular allows characteristic damping curves of which the gradient varies progressively without discontinuity.

Advantageously, the cam surface 6 and the elastic blade 4 are arranged such that the characteristic function of the torque transmitted as a function of the angular travel is a monotonous function.

Also, the cam surface 6 and the elastic blade 4 are arranged such that the transmissible torque is greater than the maximum engine torque when the roller 5 reaches the two ends of the cam track 4.

For certain applications, the cam surface 6 and the elastic blade 4 may be arranged such that the characteristics of the torque transmitted as a function of the angular travel in the reverse direction and in the direct direction are symmetrical relative to the angular rest position.

Figure 4:
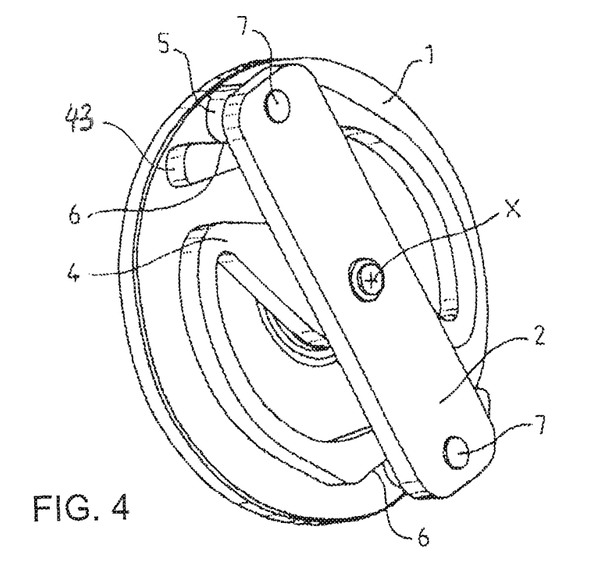
FIG. 4 is a perspective view of a vibration damper according to a second embodiment.
Figure 5:
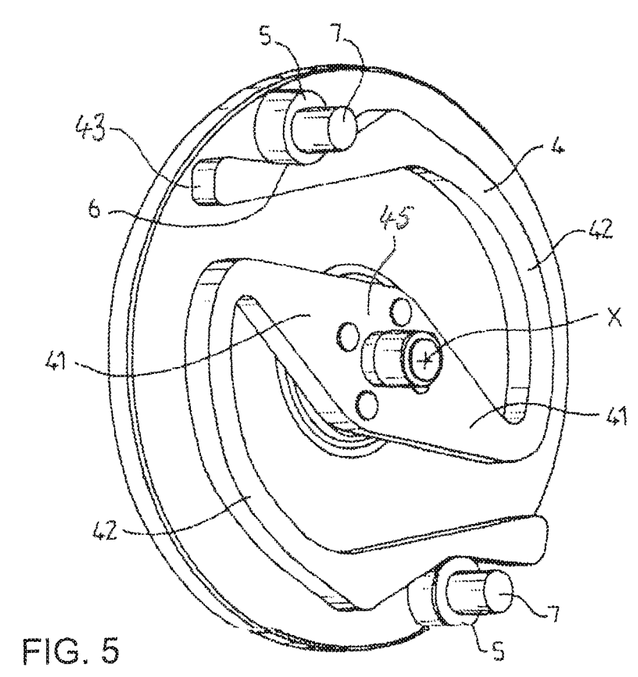
FIG. 5 illustrates in detail the damping means of the vibration damper in FIG. 4.

FIGS. 4 and 5 show a second embodiment of the invention wherein the vibration damper comprises two elastic blades 4. The first and the second elastic blades 4 are formed from a single piece and are symmetrical relative to the axis of rotation X. Moreover, the first elastic blade and the second elastic blade (4) have a common connecting portion 45 arranged around the axis of rotation X and mounted securely on the first element 1. Each of the blades 4 has a cam surface 6 cooperating with a cam follower 5. Such a structure firstly allows a balanced vibration damper, and secondly may be advantageous when the engine torque to be transmitted is high.

In one embodiment (not illustrated), a torque transmission element according to the invention is fitted with two dampers as described above, arranged in series.

In another embodiment (not illustrated), a torque transmission element is fitted with two dampers as described above, arranged in parallel.

Although the invention has been described in connection with several particular embodiments, it is evident that it is in no way limited to this and comprises all technical equivalents of the means described and their combinations where these fall within the scope of the invention. In particular, it is evident that although, in the embodiment described above, the elastic blade is mounted securely on the input element and the cam follower is mounted on the output element, the elastic blade may equally well be mounted on the output element while the cam follower is mounted on the input element.

The invention claimed is:

1. A vibration damper (14) for a torque transmitting device of a motor vehicle having an internal combustion engine and a gearbox, the vibration damper comprising:
 a first element; and
 a second element, the first and second elements rotatable on a common axis of rotation relative to each other, one of the first and second elements being an input element adapted to be drivingly coupled to the internal combustion engine and another of the first and second elements being an output element adapted to be drivingly coupled to the gearbox;
 an elastic blade (4) having a free end (43) and a cam surface (6) preceding the free end (43), the elastic blade (4) mounted securely on the first element, the cam surface (6) formed by a radially outer surface of the elastic blade (4);
 a cam follower (5) carried by the second element and configured to cooperate with the cam surface (6) of the elastic blade (4), the cam follower (5) being a roller rotatably mounted on the second element (2) so as to be arranged radially outside the elastic blade (4);
 the cam surface (6) being arranged such that, for an angular travel between the first element (1) and the second element (2) relative to an angular rest position, the cam follower (6) exerts a flexion force on the elastic blade (4) producing a reaction force able to return the first element (1) and the second element (2) to the angular rest position.

2. The vibration damper as claimed in claim 1, wherein the cam surface (6) is formed at the free end (43) of the elastic blade (4).

3. The vibration damper as claimed in claim 2, wherein the elastic blade (4) comprises a portion (41) of radial orientation extended by a curved portion (42), and wherein the cam surface (6) is formed by a radially outer surface of the curved portion (42) of the elastic blade (4).

4. The vibration damper as claimed in claim 1, further comprising a second elastic blade (4) provided with a second cam surface (6) and mounted securely on the first element, and a second cam follower (5) arranged to cooperate with the second cam surface (6) of the second elastic blade (4).

5. The vibration damper as claimed in claim 4, wherein the first and second elastic blades (4) are symmetrical relative to the axis of rotation (X).

6. The vibration damper as claimed in claim 4, wherein the first and second elastic blades (4) are integral.

7. The vibration damper as in claim 4, wherein the first elastic blade and the second elastic blade have a common connecting portion arranged around the axis of rotation X and mounted securely on the first element (1).

8. The vibration damper as claimed in claim 1, wherein the roller (5) is mounted rotatably on the second element (2) via a bearing.

9. The vibration damper as claimed in claim 1, wherein the damper is configured to transmit a torque exceeding 200 N·m.

* * * * *